United States Patent
Cho et al.

(10) Patent No.: US 10,990,287 B2
(45) Date of Patent: Apr. 27, 2021

(54) DATA STORAGE DEVICE CAPABLE OF REDUCING LATENCY FOR AN UNMAP COMMAND, AND OPERATING METHOD THEREOF

(71) Applicant: SK hynix Inc., Gyeonggi-do (KR)

(72) Inventors: Young Ick Cho, Seoul (KR); Byeong Gyu Park, Gyeonggi-do (KR); Sung Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/584,266

(22) Filed: Sep. 26, 2019

(65) Prior Publication Data
US 2020/0218455 A1    Jul. 9, 2020

(30) Foreign Application Priority Data
Jan. 7, 2019 (KR) .................. 10-2019-0001715

(51) Int. Cl.
*G06F 3/06* (2006.01)
*G06F 12/02* (2006.01)
*G06F 12/0873* (2016.01)

(52) U.S. Cl.
CPC .......... *G06F 3/0608* (2013.01); *G06F 3/0652* (2013.01); *G06F 3/0659* (2013.01); *G06F 3/0679* (2013.01); *G06F 12/0246* (2013.01); *G06F 12/0873* (2013.01); *G06F 2212/7201* (2013.01)

(58) Field of Classification Search
CPC ............. G06F 12/0246; G06F 12/0873; G06F 3/0608; G06F 3/0652; G06F 3/0659; G06F 3/0679; G06F 2212/7201; G06F 2212/7205
See application file for complete search history.

(56) References Cited

U.S. PATENT DOCUMENTS

| | | | | |
|---|---|---|---|---|
| 6,018,779 A | * | 1/2000 | Blumenau | G06F 13/387 710/6 |
| 10,089,235 B1 | * | 10/2018 | Taylor | G06F 12/0871 |
| 2015/0058546 A1 | * | 2/2015 | Lim | G06F 3/0613 711/103 |
| 2015/0149741 A1 | * | 5/2015 | Zhuo | G06F 3/0611 711/170 |
| 2019/0163602 A1 | | 5/2019 | Park et al. | |
| 2019/0286370 A1 | * | 9/2019 | Lee | G06F 3/0604 |

FOREIGN PATENT DOCUMENTS

KR    101427535    8/2014

OTHER PUBLICATIONS

Seagate Technology LLC, "SCSI Commands Reference Manual," Publication No. 100293068, Rev. J Oct. 2016.*

* cited by examiner

*Primary Examiner* — Tracy A Warren
(74) *Attorney, Agent, or Firm* — IP & T Group LLP

(57) ABSTRACT

A data storage device may include: a nonvolatile memory device; and a controller configured to control an operation of the nonvolatile memory device. In response to an unmap command is received from a host, the controller may generate an unmap descriptor including logical block addresses to be trimmed, stores the generated unmap descriptor, and transfer a response signal to the host. The response signal indicates that an unmap caching operation corresponding to the unmap command is completed.

13 Claims, 12 Drawing Sheets

DATA STORAGE DEVICE CAPABLE OF REDUCING LATENCY FOR AN UNMAP COMMAND, AND OPERATING METHOD THEREOF

CROSS-REFERENCE TO RELATED APPLICATION

The present application claims priority under 35 U.S.C. § 119(a) to Korean application number 10-2019-0001715, filed on Jan. 7, 2019, in the Korean Intellectual Property Office, which is incorporated herein by reference in its entirety.

BACKGROUND

1. Technical Field

Various embodiments generally relate to an electronic device, and more particularly, to a data storage device and an operating method thereof.

2. Related Art

Recently, the paradigm for computing has changed to a ubiquitous computing environment in which computer systems can be used anytime anywhere. Therefore, the use of portable electronic devices such as mobile phones, digital cameras and notebook computers has rapidly increased. Such portable electronic devices generally use a data storage device using a memory device. The data storage device is used to store data of the associated portable electronic device.

Since a data storage device using a memory device has no mechanical driver, such data storage device has excellent stability and durability, high information access speed, and low power consumption. A data storage device having such advantages includes a universal serial bus (USB) memory device, a memory card having various interfaces, a universal flash storage (UFS) device, and a solid state drive (SSD).

SUMMARY

Various embodiments are directed to a data storage device capable of reducing latency for an unmap command and an operating method thereof.

In an embodiment, a data storage device may include: a nonvolatile memory device; and a controller configured to control an operation of the nonvolatile memory device. In response to an unmap command is received from a host, the controller may generate an unmap descriptor including logical block addresses to be trimmed, store the generated unmap descriptor, and transfer a response signal to the host. The response signal indicates that an unmap caching operation corresponding to the unmap command is completed.

In an embodiment, there is provided an operating method of a data storage device which includes a nonvolatile memory device and a controller configured to control the nonvolatile memory device. The operating method may include: generating an unmap descriptor including logical block addresses to be trimmed in response to an unmap command received from a host; and transferring a response signal to the host. The response signal indicates that an unmap caching operation corresponding to the unmap command is completed.

In an embodiment, there is provided an operating method of a controller for controlling a memory device. The operating method may include: queueing an unmap command; generating an unmap descriptor corresponding to the unmap command; responding to the unmap command; and trimming, after the responding, a logical address indicated by the unmap descriptor according to the queued unmap command. The logical address is part of map information representing mapping relationships between logical and physical addresses indicating storage locations within the memory device.

FIG. GB is a diagram illustrating a read operation when an unmap descriptor including the same logical block address as that corresponding to a read request has been most recently stored.

Figure 7:
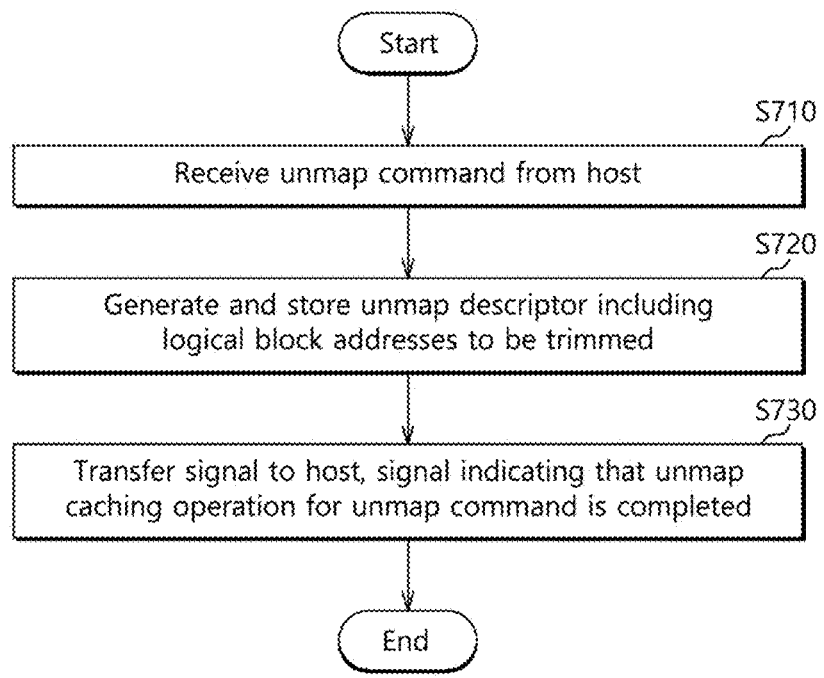

FIG. 7 is a flowchart illustrating an operating method of the data storage device in accordance with an embodiment.

Figure 8:
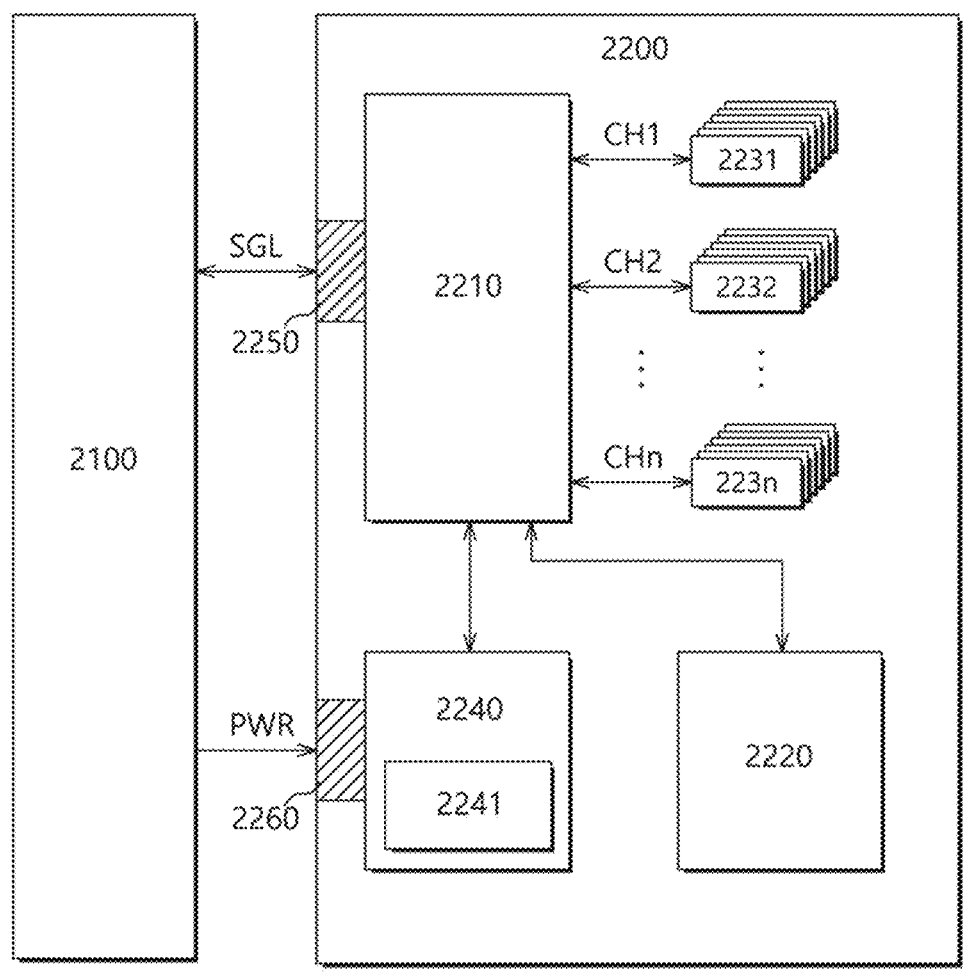

FIG. 8 illustrates a data processing system including a solid state drive (SSD) in accordance with an embodiment.

Figure 9:
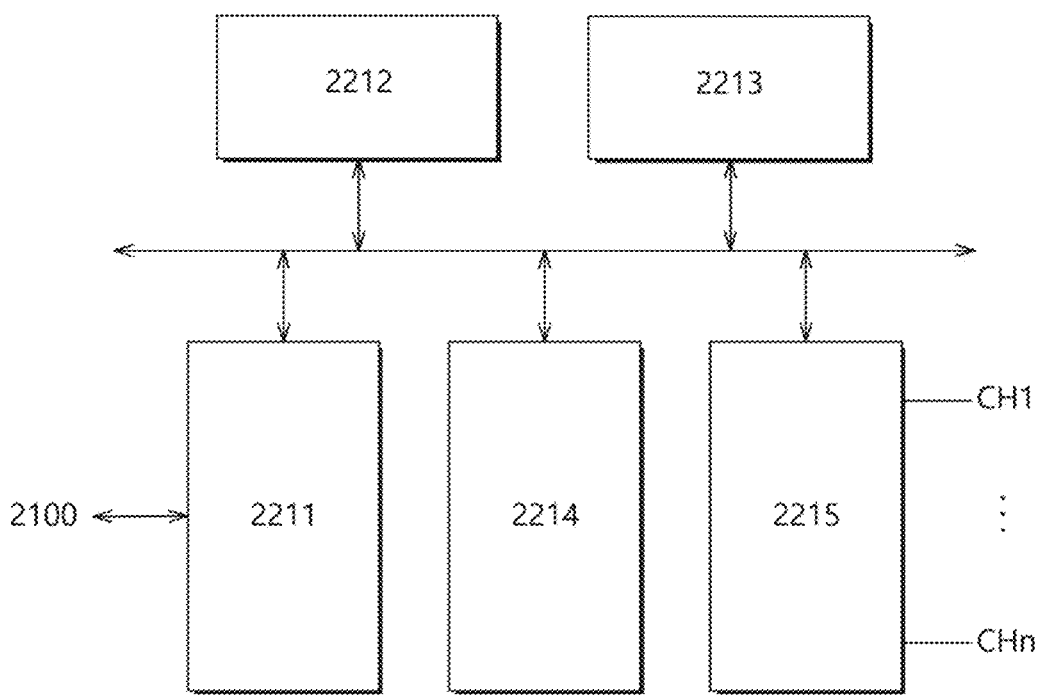

FIG. 9 illustrates a controller, such as that illustrated in FIG. 8.

Figure 10:
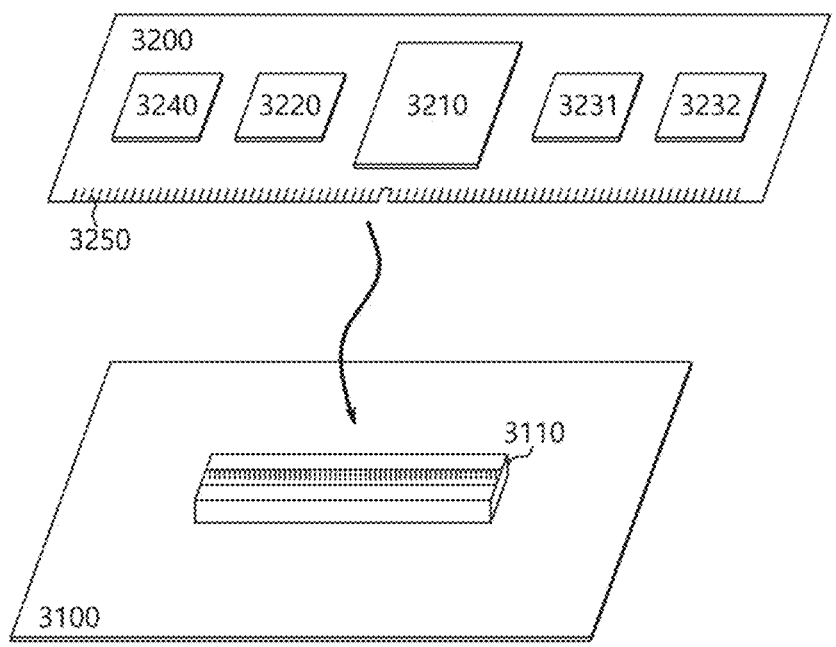

FIG. 10 illustrates a data processing system including a data storage apparatus in accordance with an embodiment.

Figure 11:
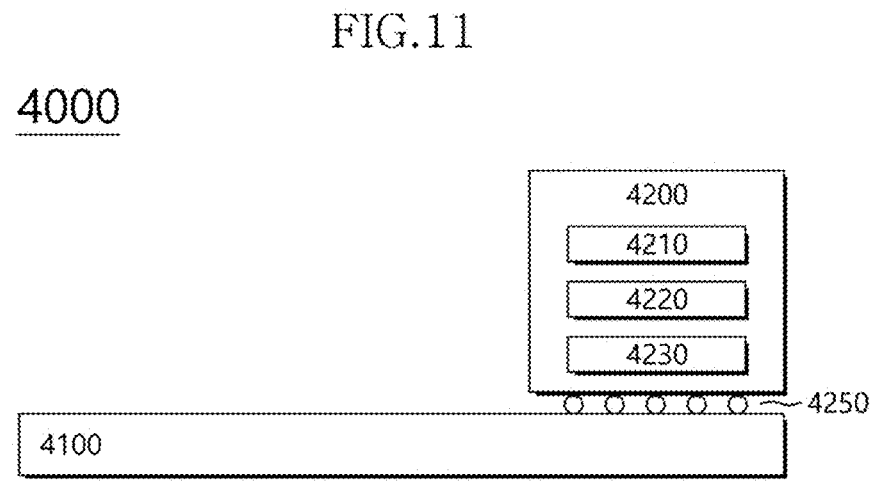

FIG. 11 illustrates a data processing system including a data storage apparatus in accordance with an embodiment.

Figure 12:
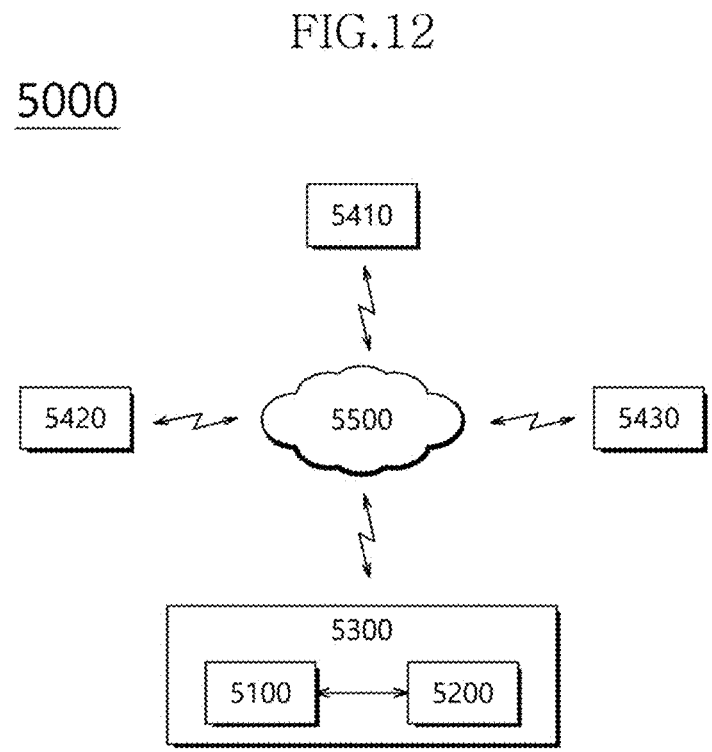

FIG. 12 illustrates a network system including a data storage apparatus in accordance with an embodiment.

Figure 13:
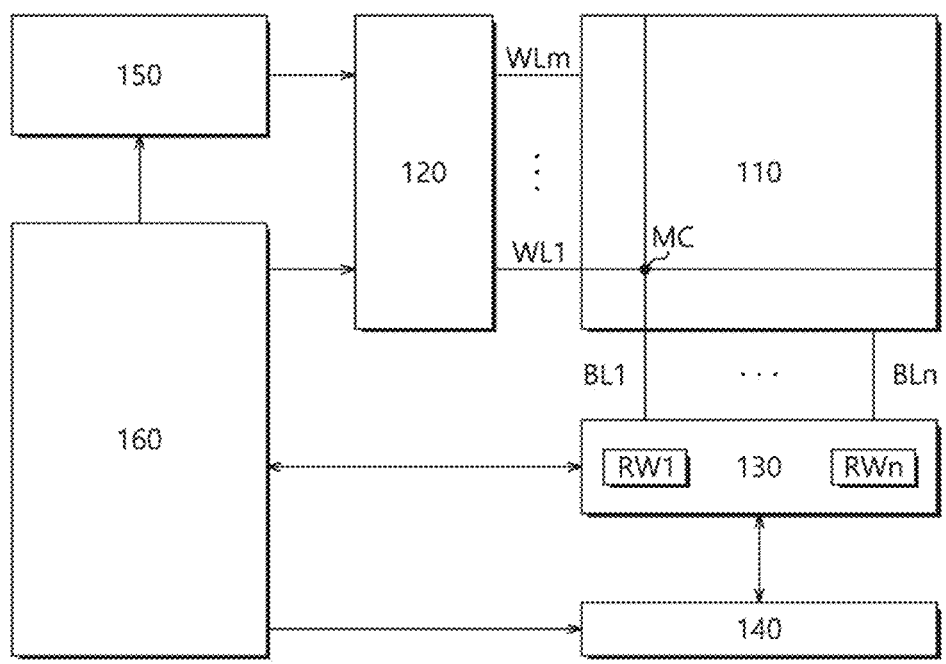

FIG. 13 illustrates a nonvolatile memory device included in a data storage apparatus in accordance with an embodiment.

DETAILED DESCRIPTION

A data storage device and an operating method thereof according to embodiments of the present invention is described below with reference to the accompanying drawings. Throughout the specification, reference to "an embodiment" or the like is not necessarily to only one embodiment, and different references to any such phrase is not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
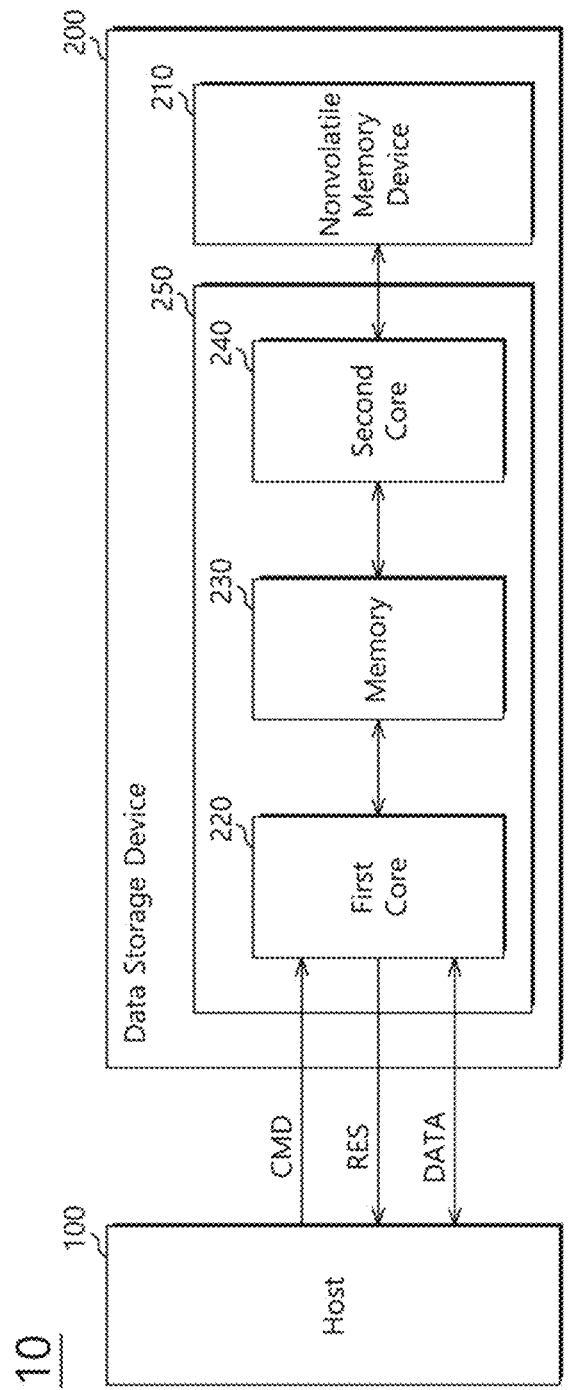
FIG. 1 is a diagram illustrating a data processing system including a data storage device in accordance with an embodiment.

FIG. 1 is a diagram illustrating a data processing system 10 including a data storage device 200 in accordance with an embodiment.

Referring to FIG. 1, the data processing system 10 may include a host 100 and a data storage device 200. The host 100 may transfer a command CMD to the data storage device 200. The data storage device 200 may perform an operation corresponding to the received command CMD, and transfer a response RES including the performance result to the host 100. The host 100 and the data storage device 200 may transfer and receive data DATA.

The host 100 may include a mobile phone, an MP3 player, a laptop computer, a desktop computer, a game machine, a TV, an in-vehicle infotainment system and the like, but the present invention is not limited thereto. The host 100 may be any suitable electronic device.

The data storage device 200 may store data accessed by the host 100. The data storage device 200 may be configured as any of various storage devices, according to an interface protocol coupled to the host. For example, the data storage device 200 may be configured as any of a solid state drive (SSD), a multi-media card (MMC) such as an eMMC, RS-MMC or micro-MMC, a secure digital (SD) card such as a mini-SD or micro-SD, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 200 may be fabricated as any of various types of packages. For example, the data storage device 200 may be fabricated as any of a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 200 may include a nonvolatile memory device 210 and a controller 250.

The nonvolatile memory device 210 may operate as a storage medium of the data storage device 200. The nonvolatile memory device 210 may be configured as any of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using chalcogenide alloys, and a resistive random access memory (ReRAM) using transition metal oxide, depending on the type of memory cells.

For clarity, FIG. 1 illustrates the nonvolatile memory device 210 as one block, but the nonvolatile memory device 210 may include a plurality of memory chips. The present invention may be applied in the same manner to the data storage device 200 including the nonvolatile memory device 210 constituted by a plurality of memory chips.

The nonvolatile memory device 210 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each memory cell of the memory cell array may be implemented as a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array may include one or more of the SLC, the MLC, the TLC and the QLC. The memory cell array may include memory cells with a two-dimensional horizontal structure or memory cells with a three-dimensional vertical structure.

The controller 250 may control overall operations of the data storage device 200. The controller 250 may process the command CMD received from the host. The controller 250 may generate control signals for controlling an operation of the nonvolatile memory device 210 based on the command CMD received from the host, and provide the generated control signals to the nonvolatile memory device 210. The controller 250 may include a first core 220, a memory 230 and a second core 240.

The first core 220 may be configured to interface the host and the data storage device 200 in response to a protocol of the host 100. Therefore, the first core 220 may be referred to as a protocol core. For example, the first core 220 may communicate with the host through any of various protocols, such as USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and/or PCI-E (PCI express).

The first core 220 may include a micro control unit (MCU) and a central processing unit (CPU). The first core 220 may receive commands CMD transferred from the host 100 and provide the received commands CMD to the second core 240.

The first core 220 may store data (for example, write data) received from the host 100 in a write buffer of the memory 230. For this operation, the controller 250 may further include a data transfer block 225 (shown in FIG. 3) for transferring the write data received from the host 100 to a write buffer of the memory 230. For example, the data transfer block 225 may be configured to store, in the write buffer of the memory 230, the write data received from the host 100 according to a control signal Ctrl_dt received from the first core 220.

The first core 220 may transfer data stored in a read buffer of the memory 230 (for example, read data) to the host 100 using the data transfer block 225. For example, the data transfer block 225 may be configured to transfer the read data from the read buffer of the memory 230 to the host 100 according to the control signal Ctrl_dt received from the first core 220.

The first core 220 may generate a descriptor based on a command CMD received from the host 100 and provide the generated descriptor to the second core 240. The descriptor may indicate a statement of work, which includes information required for the second core 240 to process the command CMD received from the host 100. In the present embodiment, the first core 220 may generate a write descriptor and an unmap descriptor for a write command and an unmap command, respectively, which are received from the host 100. The write descriptor and the unmap descriptor may have the same format.

The memory 230 may be configured as a RAM such as a static RAM (SRAM), but is not limited thereto. The memory 230 may be physically and electrically coupled to the first and second cores 220 and 240. The memory 230 may store software driven by the second core 240, i.e., firmware. Furthermore, the memory 230 may store data required for driving the firmware, for example, metadata. That is, the memory 230 may operate as a working memory of the second core 240.

The memory 230 may include a buffer for temporarily storing write data to be transferred to the nonvolatile memory device 210 from the host 100 or read data to be transferred to the host 100 from the nonvolatile memory device 210. That is, the memory 230 may operate as a buffer memory. The internal configuration of the memory 230 is described in detail below with reference to FIG. 2.

The second core 240 may control overall operations of the data storage device 200 by driving the firmware loaded to the memory 230. The second core 240 may decode and drive a code-based instruction or algorithm such as firmware or software. Therefore, the second core 240 may also be referred to as an FTL (Flash Translation Layer) core. The second core 240 may include a micro control unit (MCU) and a central processing unit (CPU).

The second core 240 may generate control signals for controlling an operation of the nonvolatile memory device 210 based on a command provided through the first core 220, and provide the generated control signals to the nonvolatile memory device 210. The control signals may include a command, an address and an operation control signal for controlling the nonvolatile memory device 210. The second core 240 may provide write data to the nonvolatile memory device 210, or receive read data from the nonvolatile memory device 210.

The second core 240 may include an ECC circuit configured to perform an ECC (Error Correction Code) encoding operation of generating parity data by ECC-encoding write data provided from the host 100 and an ECC decoding operation of detecting and correcting an error contained in data read from the nonvolatile memory device 210 using the parity data.

Figure 2:
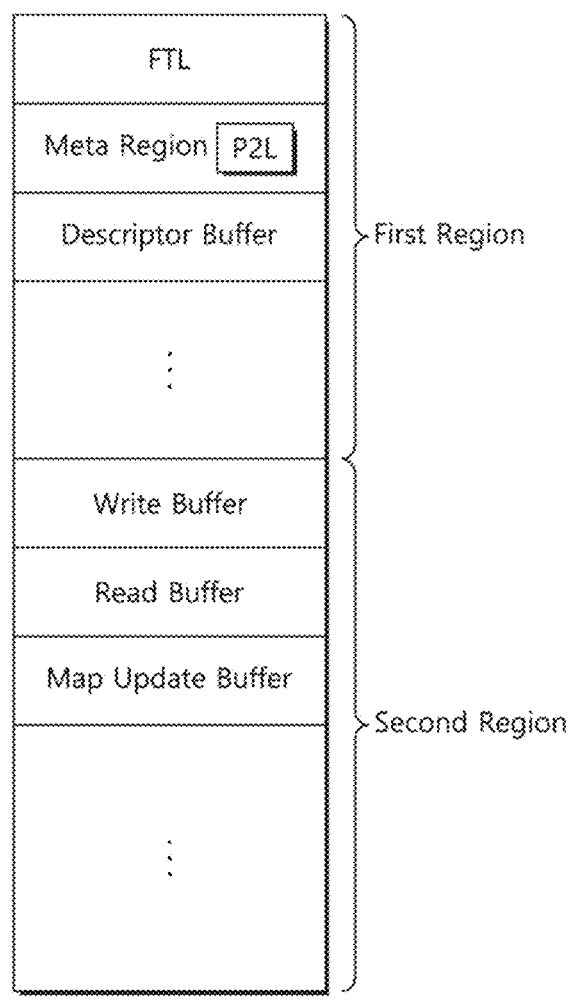
FIG. 2 is a diagram illustrating a memory, such as that of FIG. 1.

FIG. 2 is a diagram illustrating the memory 230 of FIG. 1.

Referring to FIG. 2, the memory 230 in accordance with an embodiment may be generally divided into first and second regions, but is not limited thereto. The first region of the memory 230 may include a descriptor buffer configured to store descriptors generated by the first core 220. The first region of the memory 230 may store firmware analyzed and driven by the second core 240 and metadata required for the second core 240 to perform a computing and processing operation. The second region of the memory 230 may include buffers for temporarily storing write data, read data, map data and the like, but is not limited thereto.

A physical distance between the first region of the memory 230 and each of the first and second cores 220 and 240 may be less than a distance between the second region of the memory 230 and each of the first and second cores 220 and 240, but the present invention is not limited thereto. As the first region of the memory 230 is located physically close to the first and second cores 220 and 240, the first and second cores 220 and 240 may quickly access necessary data.

For example, the first region of the memory 230 may store an FTL. The FTL may indicate software driven by the second core 240, and the second core 240 may drive the FTL to control a unique operation of the nonvolatile memory device 210, and to provide device compatibility to the host 100. As the FTL is driven, the host 100 may recognize and use the data storage device 200 as a general data storage device such as a hard disk.

The FTL may include modules for performing various functions. For example, the FTL may include a read module, a write module, a garbage collection module, a wear-leveling module, a bad block management module, a map module and the like. The FTL may be stored in a system region (not illustrated) of the nonvolatile memory device 210. When the data storage device 200 is powered on, the FTL may be read from a system region of the nonvolatile memory device 210 and loaded to the first region of the memory 230. The FTL loaded to the first region of the memory 230 may be loaded to a memory (not illustrated) which is dedicated to the second core 240 and separately provided inside or outside the second core 240.

The first region of the memory 230 may include a meta region for storing metadata required for driving the various modules included in the FTL. Furthermore, a P2L (Physical-to-Logical) table may be stored in the meta region.

The second region of the memory 230 may include a write buffer, a read buffer, a map update buffer and the like.

The write buffer may be configured to temporarily store write data to be transferred to the nonvolatile memory device 210 from the host 100. The read buffer may be configured to temporarily store read data which is read from the nonvolatile memory device 210 and will be transferred to the host 100. The map update buffer may be configured to temporarily store a map segment whose mapping information is to be updated.

Figure 3:
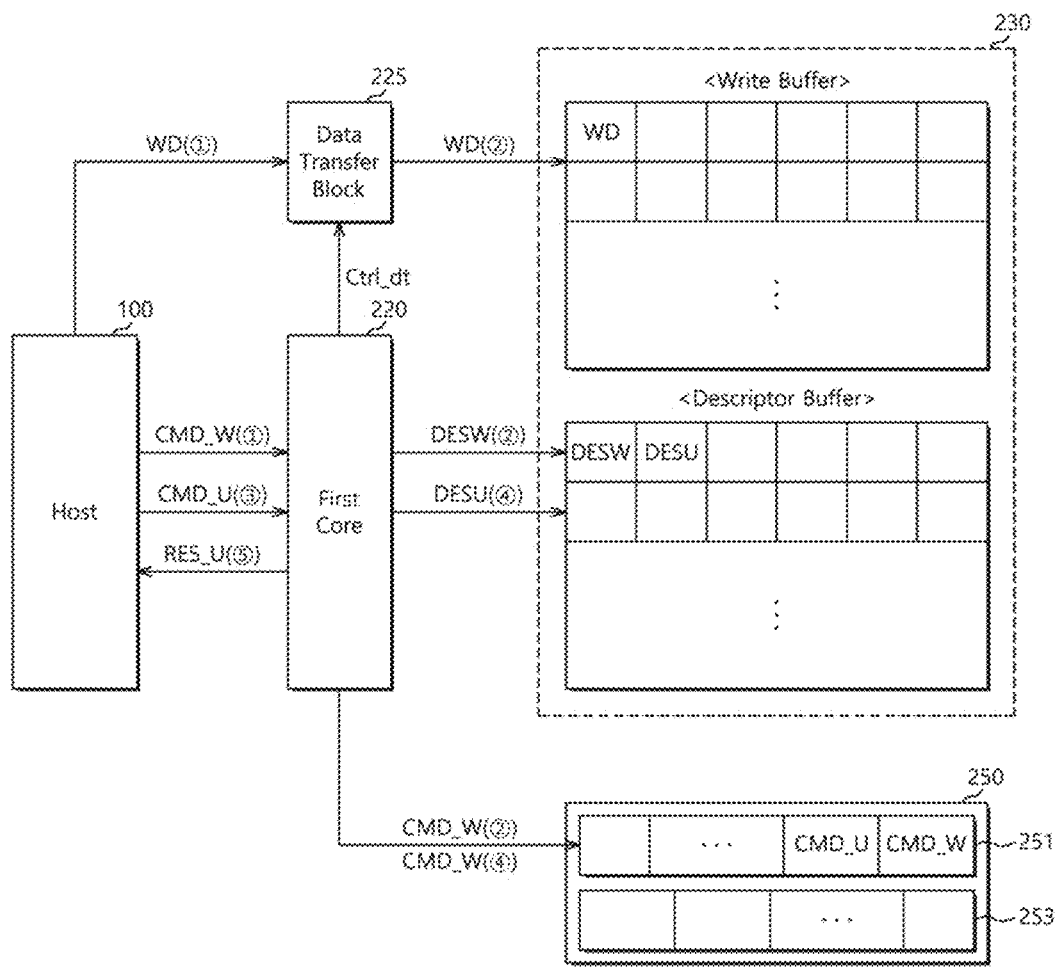
FIG. 3 is a diagram illustrating that a first core generates and stores descriptors for commands received from a host, and transfers a response to an unmap command to the host.

FIG. 3 is a diagram illustrating that the first core 220 generates and stores descriptors for commands CMD received from the host 100 and transfers a response to an unmap command CMD_U to the host 100.

When a write command CMD_W and write data WD are received from the host 100 (①), the first core 220 may queue the received write command CMD_W in a command queue 251 of a mail box 250 (②). Simultaneously, the first core 220 may generate a write descriptor DESW based on the write command CMD_W, and store the generated write descriptor DESW in a descriptor buffer of the memory 230 (②). Furthermore, the data transfer block 225 may store the write data WD received from the host 100 in the write buffer of the memory 230 according to the control signal Ctrl_dt received from the first core 220 (②).

Then, when an unmap command CDM_U is received from the host 100 (③), the first core 220 may queue the received unmap command CMD_U in the command queue 251 of the mail box 250 (④), and generate an unmap descriptor DESU based on the unmap command CMD_U and store the generated unmap descriptor DESU in the descriptor buffer of the memory 230 (④). Furthermore, the first core 220 may transfer a response signal RES_U to the unmap command CMD_U to the host 100 (⑤), after storing the unmap descriptor DESU in the descriptor buffer of the memory 230.

As such, the first core 220 may transfer the response signal RES_U to the unmap command CMD_U to the host 100 as soon as the unmap descriptor DESU is stored in the descriptor buffer of the memory 230, regardless of whether an unmap process is completed. Therefore, unmap latency measured at the host 100 can be reduced.

The host 100 may transfer a command CMD to the data storage device 200 in an asynchronous manner, that is, regardless of whether a response signal responding to a previous command is received from the data storage device 200. Therefore, the latency of a current unmap command and latency for one or more commands transferred before the current unmap command may be all regarded as the cumulative latency for the unmap command. Furthermore, when a background operation (for example, garbage collection) is performed in the data storage device 200 while those previous commands are processed, the latency for the unmap command may be further increased.

In the present embodiment, as illustrated in FIG. 3, the response signal corresponding to the unmap command may be transferred to the host 100 immediately after the unmap descriptor is generated by not the second core 240 but the first core 220, which makes it possible to solve the problem that the latency for the unmap command, measured by the host 100, is increased.

Figure 4:
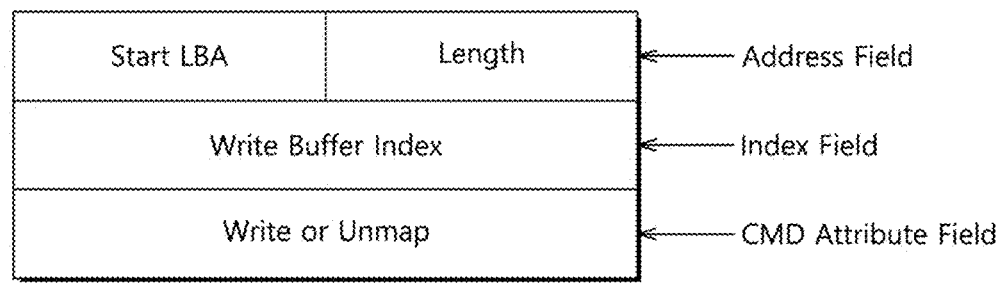
FIG. 4 is a diagram illustrating the format of a descriptor generated by the first core.

FIG. 4 is a diagram illustrating the format of the descriptor generated by the first core 220.

As described above, the first core 220 may generate the descriptors for the write command and the unmap command, respectively, which are received from the host 100. The first core 220 may generate the descriptor for the write command, i.e. a write descriptor, and the descriptor for the unmap command, i.e. an unmap descriptor, in the same format. Referring to FIG. 4, the descriptor DES generated by the first core 220 may include an address field, an index field and a command attribute field.

The address field of the descriptor DES may store values indicating a start logical block address Start LBA and length information Length for a command. The index field may store a value indicating an index of the write buffer in which write data is stored. The command attribute field may store a value indicating the type of the command, i.e. a value indicating whether the command is the write command or the unmap command.

In the write descriptor, corresponding values may be stored in the address field, the index field and the command attribute field, respectively. In the unmap descriptor, corresponding values may be stored in the address field and the command attribute field, respectively, and no value may be stored in the index field.

Figure 5A:
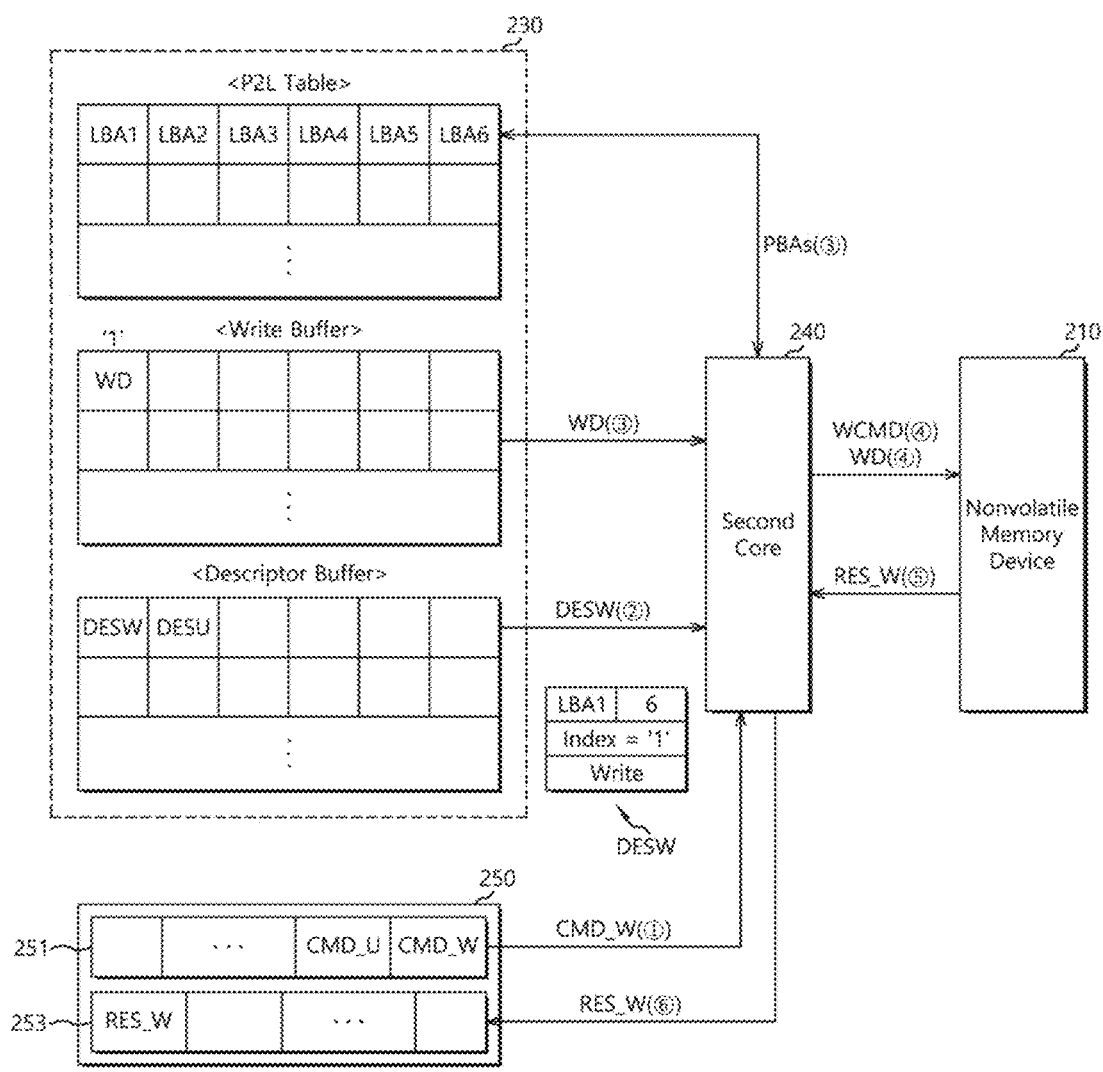
FIG. 5A is a diagram illustrating that a second core performs a write operation based on a write descriptor.
Figure 5B:
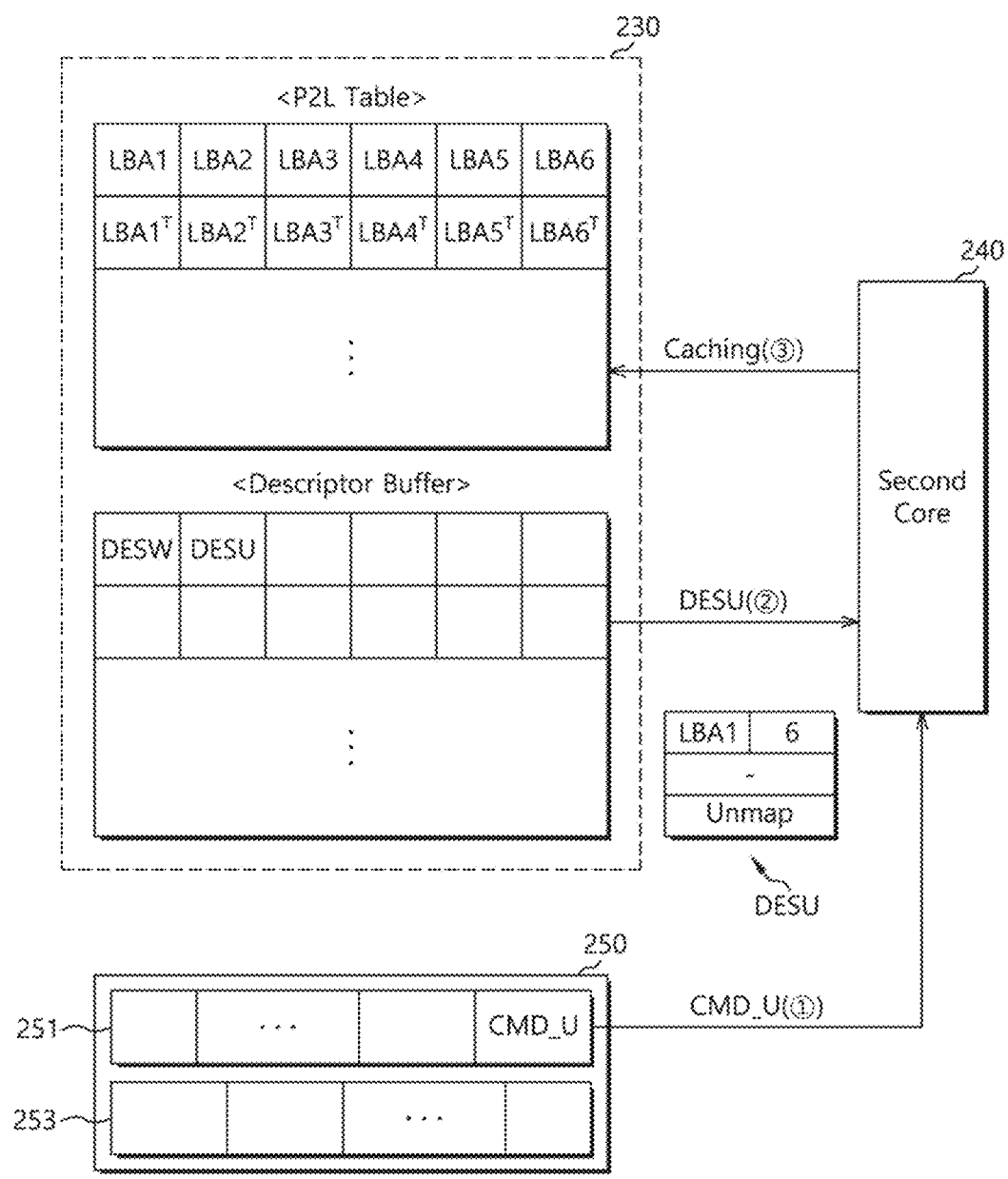
FIG. 5B is a diagram illustrating that the second core performs an unmap caching operation based on an unmap descriptor.

FIG. 5A illustrates that the second core 240 performs a write operation based on the write descriptor DESW, and FIG. 5B illustrates that the second core 240 performs an unmap caching operation based on the unmap descriptor DESU. By way of example, suppose that logical block addresses for the write command are the same as the logical block addresses for the unmap command. Furthermore, suppose that the unmap caching operation is performed after the write operation is performed.

The second core 240 may periodically poll the command queue 251 of the mail box 250. As illustrated in FIG. 3, when it is assumed that the first core 220 sequentially queued the write command CMD_W and the unmap command CMD_U in the command queue 251 of the mail box 250, the second core 240 may first dequeue the write command CMD_W from the command queue 251 (①).

The second core 240 may check that the command dequeued from the command queue 251 of the mail box 250 is a write command, and access the descriptor buffer of the memory 230 to read the write descriptor DESW (②). The second core 240 may analyze the read write descriptor DESW to check the index of the write buffer in which the write data WD is stored, and access the position of the write buffer corresponding to the index to read the write data WD (③).

For example, when the value stored in the index field of the write descriptor DESW is '1' as illustrated in FIG. 5A, the second core 240 may access the position corresponding to the index '1' of the write buffer and read the write data WD.

The second core 240 may translate logical block addresses to physical block addresses (③). For example, when the start logical block address and the length information which are stored in the address field of the write descriptor DESW are 'LBA1' and '6', the second core 240 may translate the logical block addresses 'LBA1' to 'LBA6' into corresponding physical block addresses PBAs by sequentially storing logical block addresses 'LBA1 to LBA6' in the P2L table of the memory 230. Then, the second core 240 may provide the nonvolatile memory device 210 with a write command WCMD including the translated physical block addresses PBAs and the read write data WD (④).

The nonvolatile memory device 210 may store the write data WD based on the write command WCMD received from the second core 240, and provide a response signal RES_W including the write operation performance result to the second core 240 (⑤). The second core 240 may queue the response signal RES_W received from the nonvolatile memory device 210 into a response signal queue 253 of the mail box 250 (⑥).

Then, referring to FIG. 5B, the second core 240 may dequeue the unmap command CMD_U from the command queue 251 (①). The second core 240 may check that the command dequeued from the command queue 251 of the mail box 250 is an unmap command, and access the descriptor buffer of the memory 230 to read the unmap descriptor DESU (②). The second core 240 may analyze the read unmap descriptor DESU to check logical block addresses to be trimmed, and then perform an unmap caching operation of storing unmap information in the P2L table of the memory 230 (③).

For example, when the start logical block address and the length information which are stored in the address field of the unmap descriptor DESU are 'LBA1' and '6' as illustrated in FIG. 5B, the second core 240 may determine that the logical block addresses 'LBA1' to 'LBA6' are logical block addresses to be trimmed. Therefore, the second core 240 may change trim bits of the logical block addresses 'LBA1' to 'LBA6' into a set state, and sequentially store the logical block addresses 'LBA1$^T$' to 'LBA6$^T$', whose trim bits have been changed, in the P2L table of the memory 230. Then, when a map update operation is triggered, mapping information of the logical block addresses 'LBA1' to 'LBA6' may be first changed to the corresponding physical block addresses PBAs, and then trimmed.

Figure 6A:
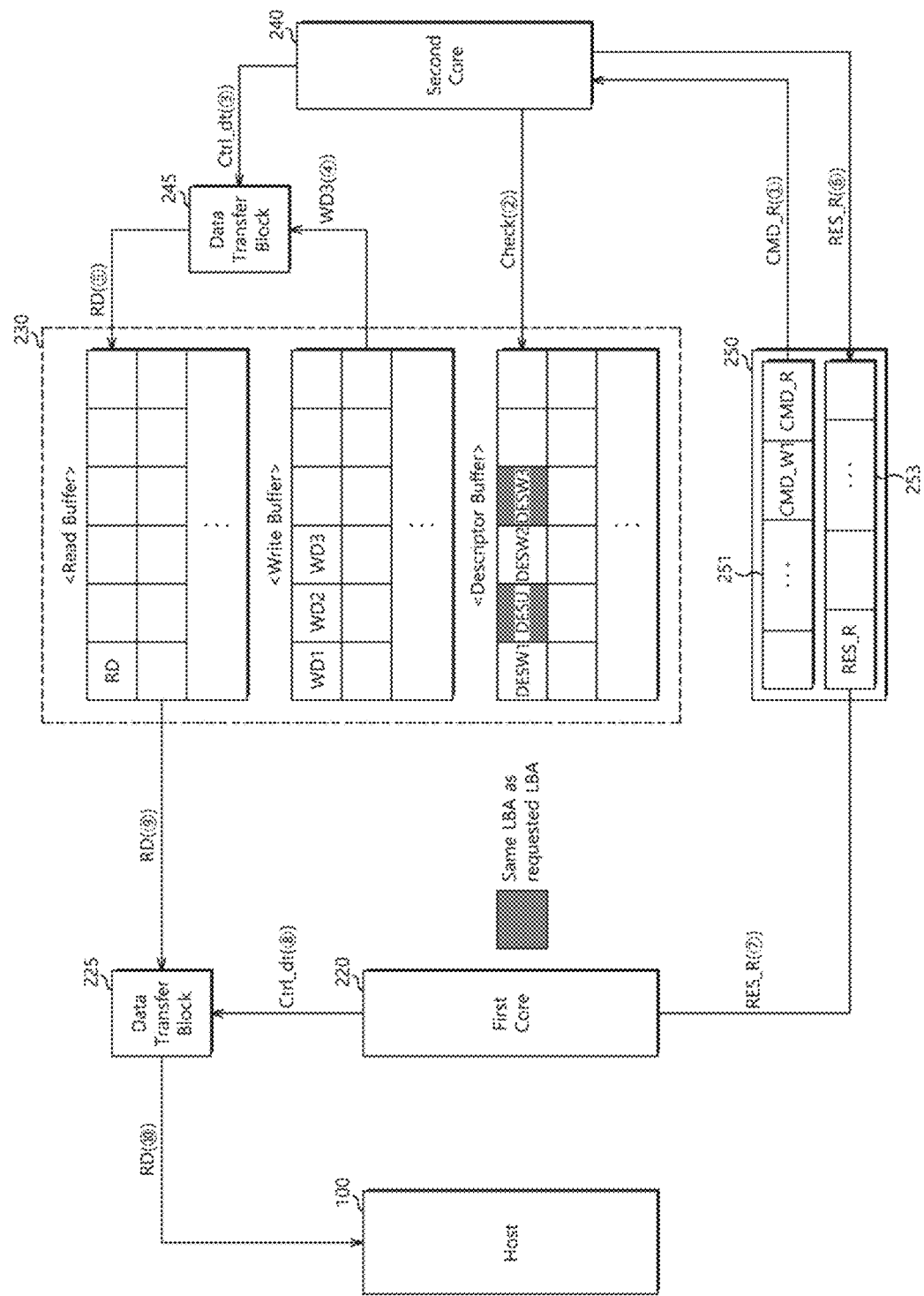
FIG. 6A is a diagram illustrating a read operation when a write descriptor including the same logical block address as that corresponding to a read request has been most recently stored.
Figure 6B:
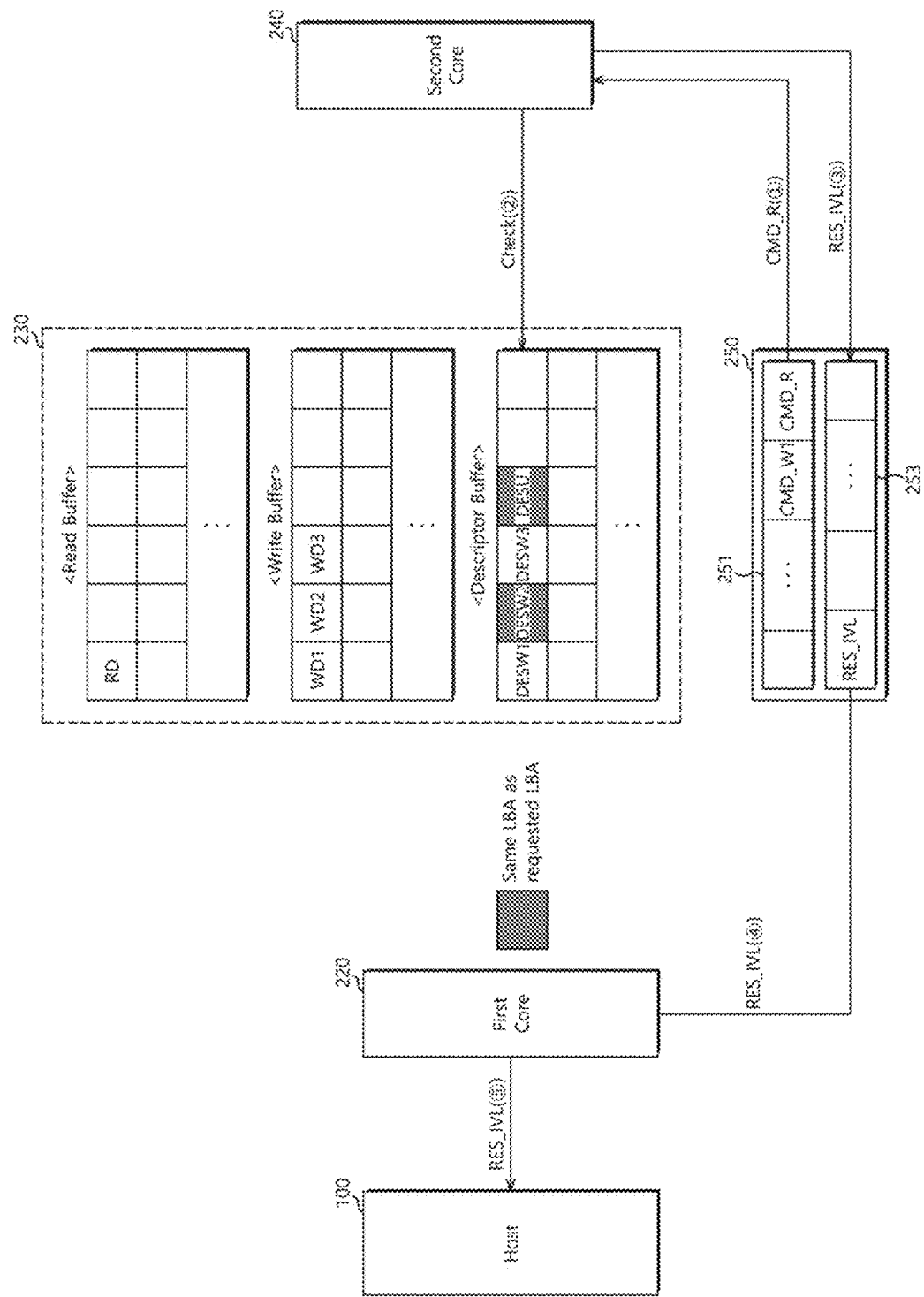

FIG. 6A illustrates a read operation when a logical block address included in the write descriptor is the same as a logical block address corresponding to a read request, and FIG. 6B illustrates a read operation when a logical block address included in the unmap descriptor is the same as a logical block address corresponding to a read request. By way of example, suppose that a plurality of write commands and an unmap command are received after a read command CMD_R is received from the host 100.

First, referring to FIG. 6A, the second core 240 may dequeue the read command CMD_R from the command queue 251 (①). The read command CMD_R may include logical block addresses to be read. The second core 240 may check whether there is a descriptor having the same logical block address as a logical block address to be read, by referring to the descriptor buffer of the memory 230 (②). The second core 240 may check the descriptors stored in the descriptor buffer from the descriptor which has been most recently stored.

For example, when an unmap descriptor DESU and a third write descriptor DESW3 include the same logical block address as the logical block address to be read, the second core 240 may analyze the third write descriptor DESW3, and then determine that data to be read is stored in the write buffer. The second core 240 may provide the control signal Ctrl_dt to a data transfer block 245 which is separately provided (③).

The data transfer block 245 may read third write data WD3 from the write buffer according to the control signal Ctrl_dt received from the second core 240 ((④)), and store the read third write data WD3 as read data RD in the read buffer ((⑤)). Then, the second core 240 may queue a response signal RES_R in the response signal queue 253 of the mail box 250 ((⑥)), the response signal RES_R including the read operation performance result for the read command CMDR.

The first core 220 may dequeue the response signal RES_R queued in the response signal queue 253 ((⑦)), and provide the control signal Ctrl_dt to the data transfer block 225 based on the response signal RES_R ((⑧)). The data transfer block 225 may read data stored in the read buffer according to the control signal Ctrl_dt received from the first core 220 ((⑨)), and transfer the read data to the host 100 ((⑩)).

Then, referring to FIG. 6B, the second core 240 may dequeue the read command CMD_R from the command queue 251 ((①)). The read command CMD_R may include logical block addresses to be read. The second core 240 may check whether there is a descriptor having the same logical block address as a logical block address to be read, by referring to the descriptor buffer of the memory 230 (②).

When the descriptor which has been most recently stored in the descriptor buffer is the unmap descriptor DESU and the unmap descriptor DESU includes the same logical block address as the logical block address to be read, the second core 240 may queue a response signal RES_IVL in the response signal queue 253 ((③)), the response signal RES_IVL including information indicating that the logical block addresses to be read are invalid logical block addresses.

The first core 220 may dequeue the response signal RES_IVL queued in the response signal queue 253 ((④)), and transfer a signal to the host 100 based on the response signal RES_IVL ((⑤)), the signal indicating that the logical block addresses for the read command CMD_R are invalid logical block addresses.

FIG. 7 is a flowchart illustrating an operating method of the data storage device in accordance with an embodiment. While such operating method is described with primary reference to FIG. 7, various components referenced in the description may be found in one or more of FIGS. 1 to 6B.

In step S710, the controller 250 of the data storage device 200 may receive an unmap command from the host 100.

In step S720, the first core 220 of the controller 250 may generate an unmap descriptor including a logical block address to be trimmed, based on the unmap command received from the host 100, and store the generated unmap descriptor in the descriptor buffer of the memory 230.

In step S730, the first core 220 may transfer a response signal to the host 100, the response signal indicating that an unmap caching operation for the unmap command is completed.

Although not illustrated in FIG. 7, the second core 240 may dequeue the unmap command from the command queue 251 of the mail box 250 after the response signal is transferred to the host 100, read the unmap descriptor corresponding to the dequeued unmap command from the descriptor buffer of the memory 230, analyze the read unmap descriptor, and perform the unmap caching operation on the logical block addresses to be trimmed.

In accordance with various embodiments, the data storage device and the operating method thereof may transfer the response signal to the unmap command to the host regardless of whether the unmap caching operation corresponding to the unmap command is received from the host is completed, thereby reducing latency for the unmap command, measured at the host.

FIG. 8 illustrates a data processing system including a solid state drive (SSD) in accordance with an embodiment. Referring to FIG. 8, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to the same channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241, which may supply the power so that the SSD 2200 is properly terminated even when sudden power-off occurs. The auxiliary power supply 2241 may include large capacity capacitors capable of charging the power PWR. [0093] The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

FIG. 9 illustrates the controller 2210 of FIG. 8. Referring to FIG. 9, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

FIG. 10 illustrates a data processing system including a data storage apparatus in accordance with an embodiment. Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 and 3232, a power management integrated circuit (PMIC) 3240, and a connection terminal 3250.

The controller 3210 may control overall operation of the data storage apparatus 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in or on any side of the data storage apparatus 3200.

FIG. 11 illustrates a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

FIG. 12 illustrates a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 200 of FIG. 1, the SSD 2200 of FIG. 8, the data storage apparatus 3200 of FIG. 10, or the data storage apparatus 4200 of FIG. 11.

FIG. 13 illustrates a nonvolatile memory device included in a data storage apparatus in accordance with an embodiment. Referring to FIG. 13, a nonvolatile memory device 100 may include a memory cell array 110, a row decoder 120, a column decoder 140, a data read/write block 130, a voltage generator 150, and control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been illustrated and described, it will be understood to those skilled in the art that the embodiments described are examples only. Accordingly, the present invention is not limited to or by the described embodiments. Rather, the present invention encompasses all variations and modifications of any of the disclosed embodiments to the extent that they fall within the scope of the claims and their equivalents.

What is claimed is:

1. A data storage device comprising:
   a nonvolatile memory device; and
   a controller configured to control an operation of the nonvolatile memory device,
   wherein, in response to an unmap command received from a host, the controller generates an unmap descriptor including logical block addresses to be trimmed, stores the generated unmap descriptor, and transfers a response signal to the host,
   wherein the response signal indicates that an unmap caching operation corresponding to the unmap command is completed,
   wherein the controller comprises:
      a first core configured to generate the unmap descriptor based on the unmap command, and transfer the response signal to the host; and
      a memory including a descriptor buffer configured to store the unmap descriptor,
   wherein the unmap descriptor comprises an address field, an index field and a command attribute field,
   wherein the index field is for storing an index for a write buffer of the memory, and
   wherein the index is not stored in the index field of the unmap descriptor.

2. The data storage device according to claim 1, wherein the first core generates a write descriptor based on a write command received from the host, and stores the generated write descriptor in the descriptor buffer of the memory.

3. The data storage device according to claim 2, wherein the first core generates the unmap descriptor and the write descriptor in the same format.

4. The data storage device according to claim 3, wherein the write descriptor comprises the address field, the index field and the command attribute field.

5. The data storage device according to claim 4, wherein the address field is for storing a start logical block address and length information, and the command attribute field is for storing a value indicating the type of a command.

6. The data storage device according to claim 2, wherein the controller further comprises a mail box including a command queue configured to sequentially queue commands received from the host, and a response signal queue configured to sequentially queue response signals indicating processing results for the commands.

7. The data storage device according to claim 6, wherein the first core sequentially queues the commands received from the host in the command queue of the mail box.

8. The data storage device according to claim 7, wherein the controller further comprises a second core configured to sequentially process the commands queued in the command queue by periodically polling the command queue of the mail box, and queue the processing results as response signals in the response signal queue of the mail box.

9. The data storage device according to claim 8, wherein when processing the unmap command queued in the command queue, the second core reads a corresponding unmap descriptor from the descriptor buffer of the memory and analyzes the read unmap descriptor, and performs the unmap caching operation.

10. An operating method of a data storage device which includes a nonvolatile memory device and a controller configured to control the nonvolatile memory device, the operating method comprising the steps of:
   generating an unmap descriptor including logical block addresses to be trimmed in response to an unmap command received from a host; and
   transferring a response signal to the host,
   wherein the response signal indicates that an unmap caching operation corresponding to the unmap command is completed,
   wherein the unmap descriptor comprises an address field, an index field and a command attribute field,
   wherein the index field is for storing an index for a write buffer to buffer write data, and wherein the index is not stored in the index field of the unmap descriptor.

11. The operating method according to claim 10, further comprising the steps of, after the step of transferring the response signal to the host:
   dequeuing the unmap command queued in a command queue;
   reading and analyzing the unmap descriptor corresponding to the unmap command; and
   performing the unmap caching operation on the logical block addresses to be trimmed.

12. The operating method according to claim 10, wherein the address field is for storing a start logical block address and length information, and the command attribute field is for storing a value indicating the type of a command.

13. An operating method of a controller for controlling a memory device, the operating method comprising:
   queueing an unmap command;
   generating an unmap descriptor corresponding to the unmap command;
   responding to the unmap command; and
   trimming, after the responding, a logical address indicated by the unmap descriptor according to the queued unmap command,
   wherein the logical address is part of map information representing mapping relationships between logical and physical addresses indicating storage locations within the memory device,
   wherein the unmap descriptor comprises an address field, an index field and a command attribute field,
   wherein the index field is for storing an index for a write buffer to buffer write data, and
   wherein the index is not stored in the index field of the unmap descriptor.

* * * * *